United States Patent
Schneider

(10) Patent No.: US 9,390,101 B1
(45) Date of Patent: Jul. 12, 2016

(54) SOCIAL DEDUPLICATION USING TRUST NETWORKS

(71) Applicant: Symantec Corporation, Mountain View, CA (US)

(72) Inventor: Scott Schneider, Sun Valley, CA (US)

(73) Assignee: Veritas Technologies LLC, Mountain View, CA (US)

( * ) Notice: Subject to any disclaimer, the term of this patent is extended or adjusted under 35 U.S.C. 154(b) by 0 days.

(21) Appl. No.: 13/710,750

(22) Filed: Dec. 11, 2012

(51) Int. Cl.
*G06F 17/30* (2006.01)
*G06F 11/14* (2006.01)

(52) U.S. Cl.
CPC ................... *G06F 17/30156* (2013.01)

(58) Field of Classification Search
CPC ............ G06F 2221/0782; G06F 11/1458; G06F 11/1464; G06F 11/1469; G06F 1/1448; G06F 11/1453; G06F 17/3015
USPC ............................................. 707/692
See application file for complete search history.

(56) References Cited

U.S. PATENT DOCUMENTS

| | | | | |
|---|---|---|---|---|
| 7,529,785 B1 * | 5/2009 | Spertus | ............... | G06F 11/1453 |
| 8,082,228 B2 * | 12/2011 | Mu | ..................... | G06F 11/1453 707/650 |
| 8,473,463 B1 * | 6/2013 | Wilk | ............................. | 707/647 |
| 2004/0003272 A1 * | 1/2004 | Bantz | .................. | G06F 11/1464 713/193 |
| 2006/0259957 A1 * | 11/2006 | Tam | ........................ | G06F 21/10 726/3 |
| 2007/0180078 A1 * | 8/2007 | Murphy | ................ | H04L 63/123 709/223 |
| 2009/0132616 A1 * | 5/2009 | Winter | ................ | G06F 11/1464 |
| 2009/0164529 A1 * | 6/2009 | McCain | .............. | G06F 11/1464 |
| 2010/0058013 A1 * | 3/2010 | Gelson | ................ | G06F 11/1453 711/162 |
| 2011/0113013 A1 * | 5/2011 | Reddy | ................. | G06F 11/1453 707/646 |
| 2012/0159175 A1 * | 6/2012 | Yocom-Piatt | ....... | G06F 11/1453 713/176 |

* cited by examiner

*Primary Examiner* — Hosain Alam
*Assistant Examiner* — Robert F May
(74) *Attorney, Agent, or Firm* — Campbell Stephenson LLP

(57) ABSTRACT

Before backing up a user file to backup storage, a trust deduplication module is configured to ask a limited set of other trust deduplication modules to check if the user file has already been backed up. If the user file is already backed up, a backup receipt that corresponds to the user file (which was provided during backup of the user file) is communicated to the requesting trust deduplication module. The backup receipt provides the requesting trust deduplication module with access to the already-backed up user file in backup storage, and the requesting trust deduplication module need not back up the user file. Thus, a single copy of the user file can be stored in backup storage among several trusted users who own an instance of the user file. A user file can be restored from backup storage, using a backup receipt that corresponds to the user file.

18 Claims, 11 Drawing Sheets

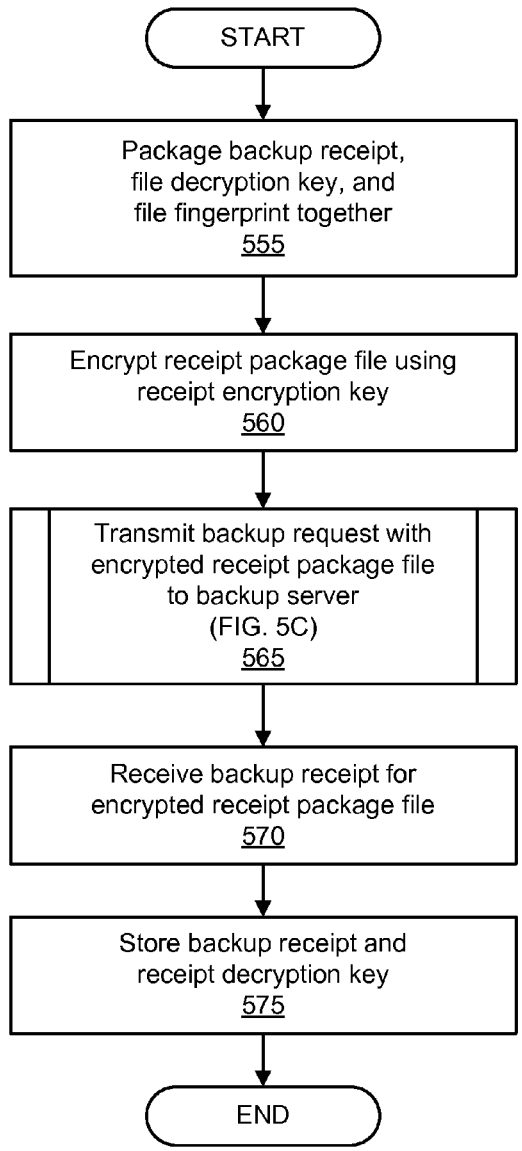
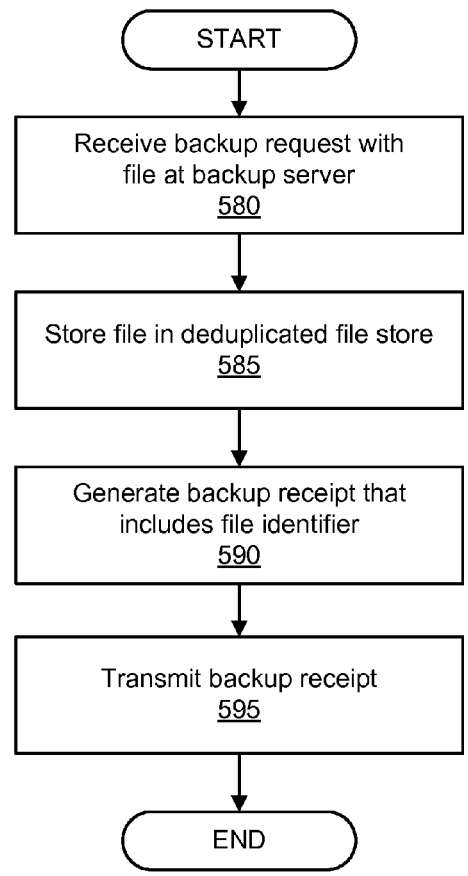
FIG. 5B
FIG. 5C

SOCIAL DEDUPLICATION USING TRUST NETWORKS

FIELD OF THE INVENTION

The present invention relates to performing deduplication in a backup context and, more particularly, to performing deduplication among members of a trust network.

DESCRIPTION OF THE RELATED ART

An ever-increasing reliance on information, and computing systems that produce, process, distribute, and maintain such information in its various forms, continues to put great demands on techniques for providing data storage and access to that data storage. Business organizations can produce and retain large amounts of data. While data growth is not new, the pace of data growth has become more rapid, the location of data more dispersed, and linkages between data sets more complex. Data deduplication offers business organizations an opportunity to dramatically reduce an amount of storage required for data backups and other forms of data storage and to more efficiently communicate backup data to one or more backup storage sites.

However, encrypted data that is stored in one or more backup storage sites may not be amenable to traditional data deduplication, such as comparing two files to determine any shared or common segments of data. For example, if a file is encrypted using two different cryptographic or encryption algorithms (or the same algorithm with different encryption keys), the two encrypted files produced will share very few common segments of data (if any), even though both unencrypted files are identical. While convergent encryption (e.g., encrypting files using encryption keys that are based on a hash value computed from the file) has been offered as a way to make encrypted data more amendable to traditional data deduplication, convergent encryption has been shown to be vulnerable to attacks (e.g., dictionary attacks, confirmation-of-file attacks), easily seeing which users store the same files.

BRIEF DESCRIPTION OF THE DRAWINGS

The present invention may be better understood, and its numerous objects, features and advantages made apparent to those skilled in the art by referencing the accompanying drawings.

FIGS. 5A, 5B, and 5C are flowcharts illustrating an example backup process, according to one embodiment.

Figure 1:
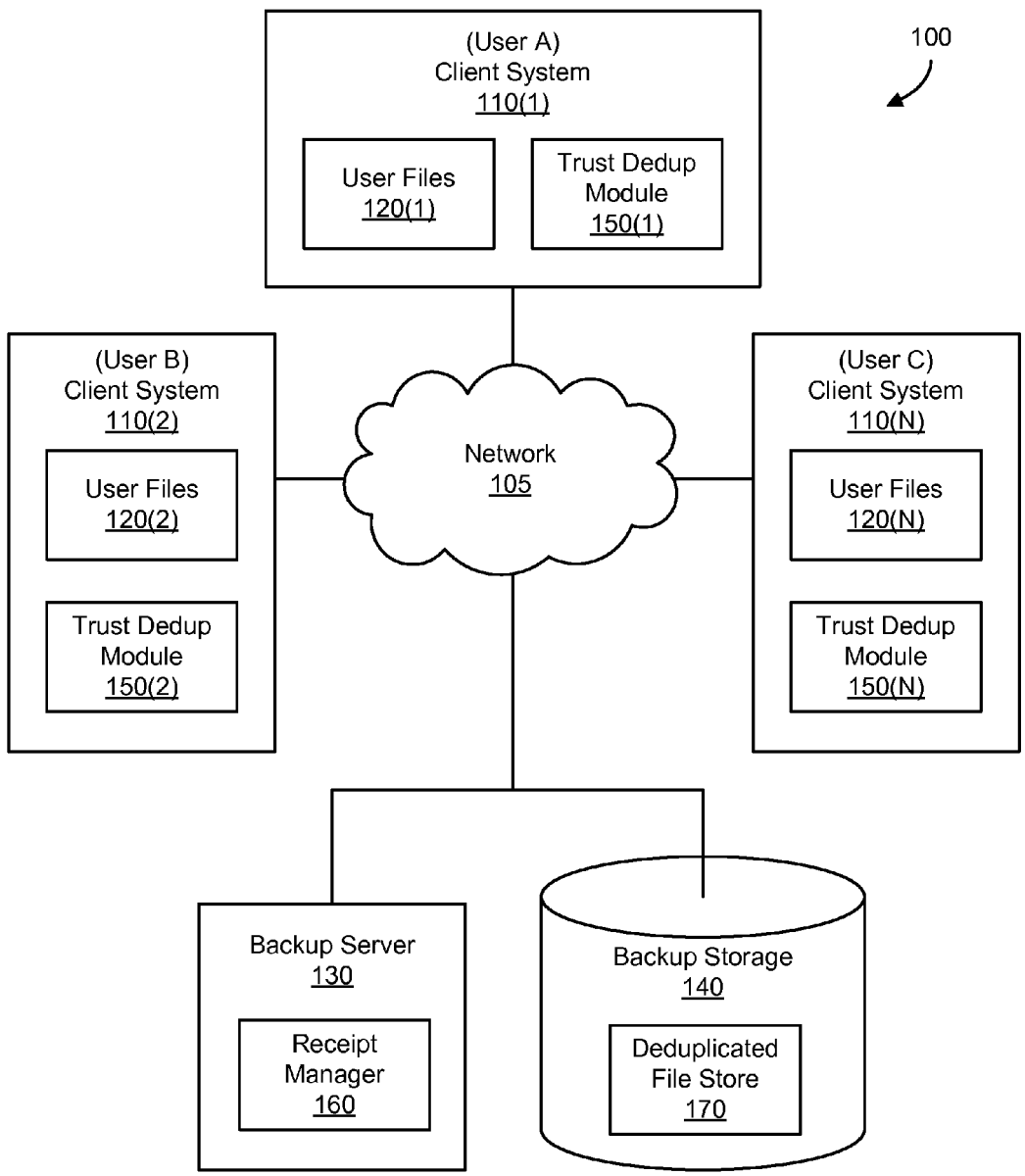
FIG. 1 is a simplified block diagram illustrating components of an example deduplication system in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

Overview

When a file owned by a first user needs to be backed up (e.g., in response to the first user's request to backup the file), the first user can ask other users in the first user's trust network (e.g., users that the first user has identified as trusted users) whether they know if the file has been backed up. Each user in a computing network is associated with a trust deduplication module. A first trust deduplication module associated with the first user determines whether any others in the first user's trust network have already backed up the file by sending a trust deduplication request for the file to other trust deduplication modules associated with trusted users in the first user's trust network. If a second trust deduplication module of a (trusted) second user has knowledge that the file has already been backed up (e.g., the second trust deduplication module possesses backup information indicating the file has been backed up to backup storage), the second trust deduplication module will respond to the trust deduplication request with the backup information of the file.

If the first trust deduplication module receives backup information for the file from another trust deduplication module, the file need not be backed up again (e.g., the first trust deduplication module does not need to send a copy of the file to backup server). Instead, the first trust deduplication module discards (or ignores) the user's request to backup the file. The first trust deduplication module can use the backup information received from the second trust deduplication module to identify and retrieve the file from backup storage, when needed.

If the first trust deduplication module does not receive backup information from another trust deduplication module (which indicates that the file has not already been backed up), the first trust deduplication module will back up the file by sending the file to backup server with a backup request. As confirmation that the backup has been performed, the first deduplication module will receive backup information from a receipt manager, where the backup information identifies the file in backup storage. The first trust deduplication module can store the backup information locally (e.g., by storing the information on a client system) or remotely (e.g., by sending the backup information to be stored on a backup server). Thus, the present invention improves the deduplication rate by involving more users when performing file deduplication of potentially encrypted content, so that only a single copy of a file that is owned by multiple users (and thus is potentially deduplicated data) in a trust network will be stored in backup storage, even if those users have each encrypted their copies of that file differently. Without this technique, a separate copy of the otherwise-identical file would need to be stored for each user that encrypted it differently than the other users.

If the first user needs to restore the file, the first trust deduplication module can send the backup information of the file (e.g., the backup information that was received from another trust deduplication module or from the receipt manager) to the receipt manager along with a restore request. The receipt manager can identify and retrieve the file using the backup information.

Example Embodiments

FIG. 1 is a simplified block diagram illustrating components of an example deduplication system 100 in which the present disclosure can be implemented. Deduplication system 100 includes a network 105 that communicatively couples one or more client systems 110(1)-(N), a backup server 130, and backup storage 140. Each component is discussed in further detail below.

One or more client systems 110(1)-(N), also referred to collectively herein as client devices 110 and/or clients 110, can each be implemented using, for example, a desktop computer, a laptop computer, a workstation, a server, or the like. An example of one such computing device is described subsequently, in connection with FIG. 8. One or more clients 110(1)-(N) can be configured to communicate with backup server 130 via network 105. Examples of network 105, which can be used by clients 110(1)-(N) to access backup server 130, include a local area network (LAN) utilizing Ethernet, IEEE 802.11x, or some other communications protocol. While FIG. 1 illustrates each client system 110 including user files 120, in other embodiments, each client system can store different user files 120 in storage that is not included within but is still local to the client system.

User files 120 can include various files that are generated and/or consumed by applications employed by a user of client system 110(1). Examples of a user include a person who uses an application of, or otherwise operates, a particular client system 110, and an application of a particular client system 110 that communicates with other components of the system on behalf of a person. In both examples, the user is associated with that particular client system, where each client system 110(1) is associated with a user. User files 120 can also include executable files, such as those used to implement applications and operating systems, as well as files that are used or generated by such executable files. User files 120 can include files generated by user applications (e.g., word processing programs, email programs, graphics programs, a database application, or the like) executing on client 110(1). While user files 120 are each shown as being identical for simplicity, it is noted that the particular sets of user files on each client system will often differ from each other in actual practice, such that only some subset of each client's files will be the same as those maintained by another client. Some of user files 120 may also be transferred to backup server 130 via a network 105 to be included in backup storage 140. Each client 110 can send different user files 120 to backup server 130.

Backup server 130 is also coupled to network 105. Backup server 130 can include one or more physical servers (e.g., one or more media servers) configured to perform a variety of tasks related to management and implementation of backup services for deduplication system 100, such as storing a backup copy of a user file (e.g., backup data) in deduplicated file store 170 on backup storage 140. Deduplicated file store 170 is a storage area in backup storage 140 in which backup data can be stored. Backup storage 140 can also include a storage area in which metadata about backup data (not shown) can be stored (e.g., a central index that includes list(s) of files stored in deduplicated file store 170, locations of the files, fingerprints of the files, and the like). In the system illustrated in FIG. 1, backup server 130 is configured to communicate with backup storage 140 for purposes of storing backup data of client systems 110(1)-(N) in resources controlled by backup server 130 (e.g., in a storage device controlled by a media server, which are both controlled by backup server 130).

Backup storage 140 can be implemented as network attached storage (NAS), file servers, storage filers, and/or network shares. Backup storage 140 can be implemented as a single storage device or as a collection of storage devices. Backup storage 140 can also be implemented as a storage area network (SAN), which couples remote storage devices to a server (e.g., a storage server), such that the remote storage devices appear as locally-attached storage devices to the server's OS, for example. Backup storage 140 can include one or more data volumes.

Backup services can be implemented in system 100 as a client-server application (not shown), with a server component (e.g., residing on backup server 130) and a client component (e.g., residing on client 110) of the client-server application. A server component can be configured to communicate with a client component during a backup process. Certain functions of the backup services can be performed by the client and server components, where the functions may be divided between the two components, or may be performed completely by one component or the other, depending on the implementation of the backup application. For example, backup server 130 can be configured to perform tasks that include communicating with clients 110 to initiate backup tasks on the clients, maintaining databases related to files and other information backed up from file systems associated with the clients, and managing or tracking resources storing backups of clients 110.

Embodiments of the present disclosure can be implemented in a trust deduplication module 150 (labeled "trust dedup module" 150(x), where 1<=x<=N, in FIG. 1) and a receipt manager 160. An instance of trust deduplication module 150 can be implemented in each of one or more client systems 110, and receipt manager 160 can be implemented in backup server 130. Trust deduplication module 150 and receipt manager 160 can cooperatively implement a trust deduplication process in system 100 by implementing a backup process that stores deduplicated backup data (e.g., a single copy of a given user file) of trust network members (e.g., users of client systems 110 that are identified as trusted members) in deduplicated file store 170. Before backing up a user file to deduplicated file store 170, a trust deduplication module 150 is configured to communicate a request to a limited set of other trust deduplication modules 150 (e.g., those modules 150 associated with trusted users of a trust network), asking the modules 150 to check if the user file has already been backed up in deduplicated file store 170. If the user file is already backed up (e.g., the user file was previously backed up by another module 150), backup information (which was originally provided by receipt manager 160) that corresponds to the user file is communicated to the requesting trust deduplication module from one of the trust deduplication modules that received the request. The backup information provides the requesting trust deduplication module with access to the already-backed up user file in deduplicated file store 170 (e.g., the requesting trust deduplication module can use the backup information to identify and retrieve the user file from deduplicated file store 170), and the requesting trust deduplication module need not perform the user file backup operation. Thus, a single copy of the user file can be backed up to deduplicated data store 170 among several trusted users who own an instance of the user file. Trust deduplication module 150 and receipt manager 160 can also cooperatively implement a restore process to retrieve a user file from deduplicated file store 170, using backup information of the user file. Trust deduplication module 150 is further discussed below in reference to FIG. 2A, and receipt manager 160 is further discussed below in reference to FIG. 2B.

In light of the present disclosure, it will be appreciated that backup storage 140 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, deduplication system 100 and network 105 can include other components such as routers, firewalls and the like that are not germane to the discussion of the present disclosure and will not be discussed further herein. It will also be appreciated that other configurations are possible. For example, clients 110(1)-(N) can be directly coupled to backup server 130, and/or backup storage 140, and so on.

The letter N is used to indicate a variable number of devices or components. For example, a variable number of clients are implemented in the backup system. Although the letter N is used in describing a variable number of instances of each of these different devices and components, a repeated use of the letter N does not necessarily indicate that each device and component has a same number of N instances implemented in the backup system.

Figure 2A:
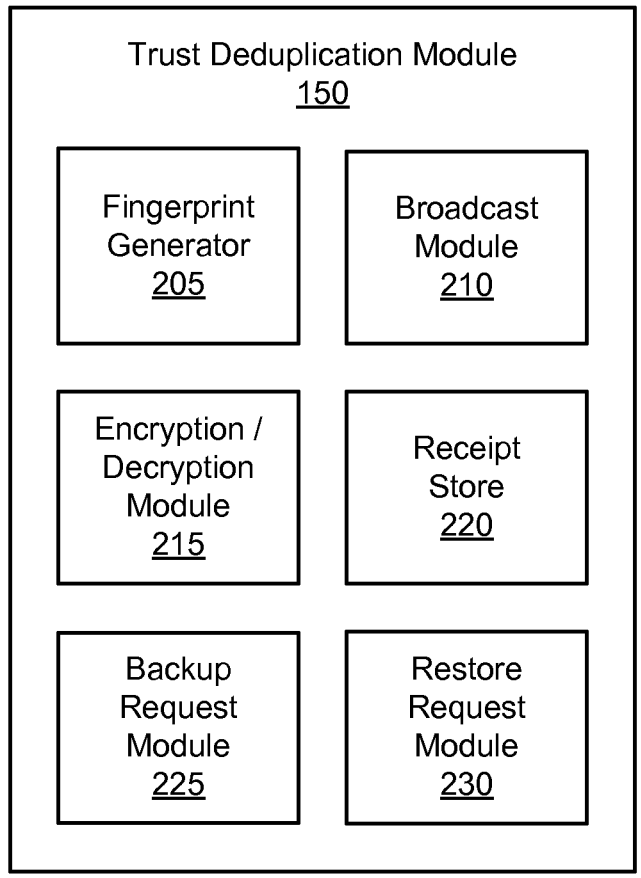
FIG. 2A is a simplified block diagram illustrating components of an example trust deduplication module, according to one embodiment.

FIG. 2A is a simplified block diagram illustrating components of an example trust deduplication module 150, which can be implemented in a client system 110, for example. Trust deduplication module 150 is configured to communicate with other trust deduplication modules in system 100, and with a receipt manager 160 implemented in backup server 130. Each trust deduplication module in the system is associated with at least one user (e.g., a user of the client system on which trust deduplication module 150 is implemented). Trust deduplication module 150 can include various components, such as fingerprint generator 205, broadcast module 210, encryption/decryption module 215, receipt store 220, backup request module 225, and restore request module 230, which are further discussed below.

Fingerprint generator 205 is configured to generate a fingerprint for a file (e.g., a user file) as part of a trust deduplication process, and to provide the file fingerprint to broadcast module 210. Fingerprint generator 205 (e.g., which operates to generate a file fingerprint) is triggered in response to an associated user's request to backup the file (e.g., in response to an input from the associated user, or in response to it being time to perform a previously scheduled backup time). A fingerprint is a unique identifier of data (e.g., a file) that can also be used to verify integrity of the data. A fingerprint can be a checksum or hash value that is calculated based upon file data (e.g., data included in a file). In many embodiments, fingerprints are generated in a manner (e.g., using a cryptographically strong, collision resistant hash function) that produces the same identifier for identical data, while also producing different identifiers for non-identical data. In one embodiment, a single fingerprint-generation technique is implemented by the fingerprint generators in the system. In another embodiment, different fingerprint-generation techniques are implemented by the fingerprint generators in the system. In one embodiment, different trust networks implement different fingerprint-generation techniques, where fingerprints can be used to effectively identify backup information compatible with members of different trust networks (which can implement different cryptographic algorithms), as further discussed further below.

Broadcast module 210 is configured to communicate with other broadcast modules 210 of other trust deduplication modules 150 in system 100. Broadcast module 210 is configured to generate a trust deduplication request (also referred to herein as a request) for the file (also referred to herein as a requested file) that the associated user wishes to backup, where the trust deduplication request includes the file fingerprint generated by fingerprint generator 205 (also referred to herein as a requested file fingerprint). Broadcast module 210 is configured to transmit the trust deduplication request to broadcast modules of trusted users that are in the associated user's trust network. In other words, broadcast module 210 transmits the trust deduplication request to each of a set of broadcast modules that are implemented on a set of client systems in system 100, where the set of broadcast modules (and/or the set of client systems) are associated with a group of users that have been previously identified by the associated user as trusted users.

The associated user can identify trusted users through social media, which can be software (e.g., an application) that provides communication between users (or between client systems associated with such users) in system 100. The associated user can communicate (e.g., share messages or user files) with one or more other users via a social media application, where the associated user has identified each of the one or more other users as a trusted user. The associated user can identify one or more trusted users from among a plurality of users that also use the social media application via a user interface of the social media application. The social media application can track such trusted users for the associated user in a list of trusted users. Such a group of trusted users (e.g., those users on the list of trusted users) are also referred to herein as a trust network (e.g., group of trusted users on the list are members in the associated user's trust network). The list of trusted users in a trust network can be stored locally at broadcast module 210 (or the social media application can share the list with the broadcast module 210). The list can be modified by the associated user via the user interface of the social media application, as needed (e.g., the associated user can add or delete users from the list). Broadcast module 210 can read the list and send a trust deduplication request to those listed users (e.g., send the request to the set of broadcast modules that are associated with the listed trusted users). As an example, broadcast module 210 can be implemented on client A (e.g., a client system associated with a User A), and client A can maintain a list that currently identifies three trusted users: clients X, Y, and Z. Accordingly, each time broadcast module 210 needs to send a request, it first reads User A's list of trusted users, which currently identifies clients X, Y, and Z, and then sends the request to the listed clients X, Y, and Z.

The trust deduplication request effectively asks the trusted users if they have knowledge that the file has already been backed up, such as by causing a broadcast module associated with a trusted user to respond with any backup information the broadcast module may have for the file. For example, a broadcast module associated with User A (where User A is associated with client A, where the broadcast module is implemented on client A) sends a trust deduplication request to a broadcast module associated with User B and implemented on User B's client (or client B), in response to determining that User A identifies User B as a trusted user in User A's trust network. In some embodiments, a trust deduplication request may not identify the requesting user or the trusted users to which the request is sent.

A trust deduplication is sent to gain backup information, if it already exists, for the file identified by the fingerprint in the request. Backup information can include a backup receipt and a file decryption key (or in one embodiment, both a file encryption key and file decryption key as an asymmetric key pair), which are further discussed below in reference to encryption/decryption module 215 and backup request module 225. Backup information for a particular file includes a backup receipt that is originally generated by the backup system and provided to the first client that backs up that file. Subsequently, the backup information can be propagated to other clients in response to trust deduplication requests. The file decryption key in the backup information is originally generated by the first client to backup that particular file, as discussed in more detail below.

In addition to sending trust deduplication requests on behalf of its associated user, broadcast module 210 is also configured to receive trust deduplication requests from other broadcast modules (e.g., from one or more requesting broadcast modules). In response to receiving a trust deduplication request, broadcast module 210 is configured to determine if any backup information for the file identified in the request is located on broadcast module 210, where the file is identified by a file fingerprint in the request. In one embodiment, broadcast module 210 is configured to locate backup information for the file by searching receipt store 220 for an entry that contains a fingerprint matching the file fingerprint in the request, where each entry in receipt store 220 stores backup information for a respective file. Continuing the above example, the broadcast module associated with User B (i.e., User B's broadcast module) receives the trust deduplication request from User A's broadcast module, and in response, User B's broadcast module searches its receipt store for any backup information for file F (which is the file identified by the fingerprint included in the request). Searching receipt store 220 is further discussed below with reference to FIGS. 3A and 3B. It is noted that receipt store 220 can include both backup information received directly from the backup system and backup information received indirectly from other broadcast modules in the system.

Broadcast module 210 can also be configured to transmit a response to a requesting broadcast module. A response can be an affirmative acknowledgement that effectively indicates broadcast module 210 has knowledge that the file has been backed up (e.g., such an acknowledgement can contain backup information for the file that has been successfully located in receipt store 220). The backup information can be included in the affirmative acknowledgement, or can be transmitted separately to the requesting broadcast module. Continuing the above example, User B's broadcast module can send an affirmative response and the located backup information for file F to User A's broadcast module, if User B's broadcast module finds file F's fingerprint in User B's receipt store.

Broadcast module 210 is also configured to store received backup information for a requested file (which was requested by that broadcast module 210) in receipt store 220. As noted above, such backup information can be received directly from the backup system or indirectly from another broadcast module. The backup information contains enough information to provide trust deduplication module 150 with access to the file that is already backed up in deduplicated data store 170. Such access is further discussed below with reference to restore request module 230. Continuing the above example, User A's broadcast module stores the backup information (received from User B's broadcast module in this example) for file F in its receipt store. In another embodiment, broadcast module 210 is configured to store the backup information for the file remotely at backup storage 140, in a manner similar to the process performed by backup request module 225, which is further described below.

In a scenario where backup information for the requested file exists (which indicates that the file has already been backed up) somewhere within the system, the file need not be backed up again by trust deduplication module 150, and broadcast module 210 discards (or ignores) the associated user's backup request (e.g., does not perform the backup request). Thus, in response to receiving an affirmative acknowledgement from at least one trust deduplication modules to which a trust deduplication request was sent, broadcast module 210 discards the backup request. In one embodiment, broadcast module 210 also (in addition to not performing the backup) informs the associated user (or backup service) that the backup was successful (as evidenced by the backup receipt). In another embodiment, broadcast module 210 also informs the associated user (or backup service) that the backup is unnecessary, transparently indicating that the backup receipt is evidence of the successful backup of the requested file. Thus, a single copy of the file is maintained in deduplicated data store 170, where trust deduplication module 150 prevents (redundant) file backup attempts by trusted users who own an instance of the file. By preventing redundant or duplicative user files from being stored in backup storage 240, trust deduplication module 150 effectively deduplicates the user files that are stored in backup storage 240. Continuing the above example, User A's broadcast module ignores the backup request upon receipt of the affirmative response from User B's broadcast module.

A response transmitted to the requesting broadcast module can also be a negative acknowledgement that effectively indicates that the broadcast module 210 that generated the response does not have knowledge that the file has been backed up (e.g., backup information for the file has not been successfully located within that broadcast module's associated receipt store). In another embodiment, a broadcast module 210 will not send any response as an effective negative acknowledgement, where the absence of a response within a pre-defined response window indicates to the requesting broadcast module that broadcast module 210 has no backup information for the file, and thus does not know if the file has been backed up. Continuing the above example, User B's broadcast module can indicate (by sending a negative acknowledgement or absence of a response as a negative acknowledgement) to User A's broadcast module that User B's broadcast module does not have any backup information for file F, if User B's broadcast module did not find file F's fingerprint in User B's receipt store.

In one embodiment, when broadcast module 210 does not have knowledge that the requested file has been backed up, broadcast module 210 can be further configured to propagate a received trust deduplication request to other trusted users before sending a response to the requesting broadcast module. This takes advantage of the fact that different users may have different trust networks, and thus may expand the number of different receipt stores that are searched for the requested file. In such a scenario, broadcast module 210 receives a trust deduplication request because broadcast module 210's associated user is identified as a trusted user in a first trust network (which is associated with the requesting client). Broadcast module 210 is configured to forward the (received) trust deduplication request to the members of broadcast module 210's associated user's trust network, which may contain different members than the first trust network.

The propagated trust deduplication request effectively asks the trusted users in this second trust network if they have knowledge that the file has already been backed up. A propagated trust deduplication request can be treated the same as an original trust deduplication request by its recipients. Continuing the above example, User B's broadcast module can propagate the trust deduplication request received from User A to User C's broadcast module (where User B identifies User C as a trusted user in User B's trust network, but User C is not necessarily in User A's trust network). In response to receiving the propagated trust deduplication request, User C's broadcast module searches its receipt store for any backup information for file F and replies (or not, in embodiments that use the absence of a response as a negative acknowledgement) appropriately to User B.

Since broadcast module 210 may be unaware of which other broadcast modules have already received a given trust deduplication request (e.g., in embodiments in which the trust deduplication requests do not identify the requesting user or the users to which the request is sent), broadcast module 210 may propagate the trust deduplication request to a broadcast module that has already received the trust deduplication request. To prevent clogging the network with repetitive propagated requests, propagation of the trust deduplication request can be limited to a pre-defined number of propagations or hops, such as by including a hop counter in the trust deduplication request that indicates the number of propagations/hops permitted (e.g., indicating that the request can be at most propagated once or twice more). In one embodiment, broadcast module 210 can modify the received request by decrementing the hop counter before propagating the request, and the request will not be propagated by additional recipients once the hop counter is decremented to zero. In other words, if the hop counter is already zero (or another prespecified final value) when a request is received, the recipient will not propagate that request. In another embodiment, a trust deduplication request can include a time to live that indicates the permitted lifespan of the request (e.g., once the time to live expires, the request is no longer propagated).

Broadcast module 210 is also configured to receive responses to the propagated trust deduplication request (e.g., affirmative and/or negative acknowledgements, as discussed above) that it propagated to its own trust network. In turn, broadcast module 210 is configured to respond to the received trust deduplication request (e.g., by providing an affirmative or negative acknowledgement, as discussed above), possibly using the responses to the propagated trust deduplication request, if any of those response were affirmative. Continuing the above example, User C's broadcast module can indicate to User B's broadcast module whether backup information for file F was found in User C's receipt store (e.g., by sending a negative acknowledgement or absence of a response, or by sending an affirmative acknowledgement with any located backup information for file F). User B's broadcast module similarly indicates to User A's broadcast module whether backup information for file F was found (e.g., by sending a negative acknowledgement or absence of a response, or by sending an affirmative acknowledgement with any located backup information for file F). If User C's broadcast module sends backup information for file F to User B's broadcast module (e.g., sent with User C's response to the propagated request), User B's broadcast module can forward the backup information for file F to User A's broadcast module (e.g., sent with User B's response to the received request), indicating to User A that file F does not need to be backed up.

In this example involving a propagated request, file F's backup information received from User C should not be stored in User B's receipt store, since User B did not wish to perform a backup of file F and may not even own file F. User B is acting as a middle-man or proxy on behalf of a requesting user by asking User B's trusted users (who may not be included in the requesting user's trust network) for backup information. If a large number of trust deduplication requests are propagated by User B's broadcast module, storing backup information of such requested files would likely result in User B's receipt store becoming quickly overpopulated with backup information about files that User B does not wish to back up or does not own.

Broadcast module 210 may also receive two or more responses to a deduplicated or original trust deduplication request from other broadcast modules, indicating that the other broadcast modules have separately (and redundantly) backed up the file. In such a scenario, broadcast module 210 can be configured to forward backup information from one responding broadcast module (e.g., the earliest received response) to the rest of the responding broadcast modules. In response to the forwarded backup information, these other responding broadcast modules can discard their own backup of that file (and corresponding backup information) and instead store the forwarded backup information, as similarly discussed above. Broadcast modules that do not desire to replace their own backups of files (and thus do not desire to receive forwarded backup information) can indicate such a desire by including a value, such as a Boolean flag, in their response that indicates whether they would like to participate in such a replacement scheme. Continuing the above example, User A's broadcast module can first receive an affirmative response from User B's broadcast module and a subsequent affirmative response from User X's broadcast module (where both User B and User X are members of User A's trust network). In one embodiment, if User X has indicated in its response that it wishes to participate in a replacement scheme (e.g., a Boolean flag is set to true in the affirmative response), User A's broadcast module will forward the backup information in User B's response to User X's broadcast module. In response to receiving the forwarded backup information, User X's broadcast module will discard the backup of the file that is stored in deduplicated data store (e.g., indicate to backup server that the encrypted file and/or corresponding encrypted receipt package file should be deleted) and discard its own backup information for the file (e.g., delete the corresponding backup information from User X's receipt store). User X's broadcast module will then store the newly received backup information for the file (e.g., add the backup information to User B's receipt store), effectively replacing User X's backup of the file with User B's backup of the file. In another embodiment, both User B and User X must indicate in their respective responses that they wish to participate in such a replacement scheme before User A's broadcast module will forward backup information in this manner.

In a scenario where backup information for the requested file does not already exist in the system (which indicates that the file has not been backed up), the file should be backed up by trust deduplication module 150. Thus, in response to receiving a negative acknowledgement from each trust deduplication module to which a trust deduplication request was sent, broadcast module 210 performs the backup request.

Broadcast module 210 is configured to perform the backup process for the file by informing encryption/decryption module 215 that the file should be encrypted.

Encryption/decryption module 215 is configured to generate a key, which can be a randomly generated number that is used in encryption (e.g., a key is used as a parameter of a cryptographic algorithm that is configured to convert cleartext of a file into ciphertext and/or convert the ciphertext back into cleartext). As used herein, cleartext of a file is unencrypted file data, and ciphertext of a file is encrypted file data. Thus, an unencrypted file includes cleartext, and an encrypted version of the file includes ciphertext. Encryption/decryption module 215 can generate a symmetric encryption/decryption key (e.g., a single key used to encrypt and decrypt data) or an asymmetric key pair that includes an encryption key (used to encrypt data) and an associated decryption key (used to decrypt data). The key(s) generated by encryption/decryption module 215 are unique, and new key(s) are generated for each file. Thus, even if a first user shares a key with a second user (e.g., as part of the backup information provided to that second user in response to a trust deduplication request), the second user can only use the key for a particular file and would not be able to use the key to decrypt other files of the first user.

In one embodiment, different trust networks implement different cryptographic algorithms. Thus, comparison of common data segments of the (differently-encrypted) encrypted files is made more difficult, helping to prevent a dictionary or confirmation-of-file attack. However, such an embodiment would also prevent deduplication beyond the trust network (e.g., no propagation of a trust deduplication request to other trusted users outside the initial trust network would be allowed, since the backup information provided from outside of the first trust network would not be useable), which would in turn reduce the deduplication rate.

In one embodiment, trust networks that implement different cryptographic algorithms may also implement different fingerprint-generation techniques, where trust networks that implement a particular cryptographic algorithm may also implement a particular fingerprint-generation technique. Since different fingerprint-generation techniques produce two different fingerprints for a same file, fingerprints produced by a particular fingerprint-generation technique can be used to effectively identify backup information that is useable by a trust network. For example, a first client in a first trust network can send a request (which includes a particular fingerprint) for a requested file to a second client in a second trust network. If the trust networks implement different cryptographic algorithms, the trust networks also implement different fingerprint-generation techniques. Thus, even if the second client has the requested file, the different fingerprints of the file prevent the second client from returning backup information about the file (e.g., the second client will not find a match to the requested fingerprint) that is not usable by the first client (e.g., the file is encrypted using a different cryptographic algorithm and the key(s) included in the backup information are not usable by the first client to decrypt the file). If the trust networks implement the same cryptographic algorithm, the trust networks can also implement the same fingerprint-generation technique. Thus, the second client can return backup information about the requested file, which is usable by the first client since the file is encrypted using the same cryptographic algorithm (and the key(s) included in the backup information are usable by the first client to decrypt the file). Thus, propagation of requests does not need to be wholly prevented in such embodiments, since fingerprints can be used to effectively identify backup information compatible with members of different trust networks.

Encryption/decryption module 215 is also configured to encrypt the file using the generated key, also referred to herein as a file encryption key (which can be either a symmetric key or an encryption key of a key pair), to produce an encrypted version of the file (or more simply, an encrypted file). Encryption/decryption module 215 provides the encrypted file and a key that can decrypt the encrypted file, also referred to herein as a file decryption key (which can be either the same symmetric key used to encrypt the file, or a decryption key associated with the encryption key of the key pair), to backup request module 225. In one embodiment, both keys of a key pair are provided to backup request module 225 with the encrypted file.

Backup request module 225 is configured to send a backup request to receipt manager 160 (implemented on backup server 130) to backup the encrypted file (e.g., store the encrypted file in deduplicated data store 170 in backup storage 140). Backup request module 225 is configured to receive a backup receipt for the encrypted file from receipt manager 160 that indicates the encrypted file has been backed up. The backup receipt also identifies the encrypted file that is now stored in deduplicated data store 170. In one embodiment, backup request module 225 is configured to store the backup receipt of the file and the file decryption key in an entry of receipt store 220 with a fingerprint of the file (where the fingerprint was computed by fingerprint generator 205 from the file's cleartext or unencrypted file data). In one embodiment, both the file encryption key and the file decryption key (as an asymmetric key pair) can be received at backup request module 225 and stored in an entry of receipt store 220. The combination of the backup receipt and file decryption key are also referred to herein as backup information for the file. Storage of backup information is further discussed below in reference to FIGS. 3A and 3B. In one embodiment, backup request module 225 informs the associated user (or backup service and/or broadcast module) that the backup of the requested file was successful.

In another embodiment, backup request module 225 is configured to store the backup information for the file remotely at backup storage 140. Backup request module 225 bundles the backup receipt, file decryption key, and file fingerprint into a receipt package, and then sends the receipt package to encryption/decryption module 215. Encryption/decryption module 215 generates another key (or key pair) and encrypts the receipt package using the generated key (also referred to herein as a receipt encryption key), which produces an encrypted version of the receipt package (or more simply, an encrypted receipt package). As similarly discussed above, the receipt encryption key can be either a symmetric key or an encryption key of a key pair. Encryption/decryption module 215 provides the encrypted receipt package and a key that can decrypt the encrypted receipt package (also referred to herein as a receipt decryption key) to backup request module 225. As similarly discussed above, the receipt decryption key can be the same symmetric key used to encrypt the receipt package, or a decryption key associated with the encryption key of the key pair. Backup request module 225 then sends a second backup request to receipt manager 160 to backup the encrypted receipt package (e.g., store the encrypted receipt package in deduplicated data store 170 in backup storage 140). Backup request module 225 is configured to receive a second backup receipt for the encrypted receipt package from receipt manager 160 that indicates the encrypted receipt package has been backed up. The second backup receipt also identifies the encrypted receipt package (which is identified simply as an encrypted file) that is now stored in deduplicated data store 170. The second backup receipt does not indicate that the encrypted receipt package is any different from any other encrypted file stored in deduplicated data store 170. Backup request module 225 then stores the second backup receipt with the associated receipt decryption key in a secondary receipt store, which is further discussed in reference to FIG. 3B.

Restore request module 230 is configured to send a restore request to receipt manager 160 to restore or retrieve a file that has been backed up (e.g., a file or a receipt package that has been encrypted and stored in deduplicated data store 170 in backup storage 140). The restore request includes a backup receipt that identifies the requested file. Restore request module 230 is configured to receive the encrypted file from receipt manager 160, and to provide the encrypted file to encryption/decryption module 215 for decryption. Encryption/decryption module 215 uses a decryption key (e.g., a file decryption key associated with a (cleartext) fingerprint of the encrypted file in receipt store 220, or a receipt decryption key associated with the backup receipt of the encrypted receipt package) to decrypt the encrypted file, which produces cleartext of the file. In one embodiment, restore request module 230 informs the associated user (or restore service and/or broadcast module) that the restore of the requested file was successful.

Figure 2B:
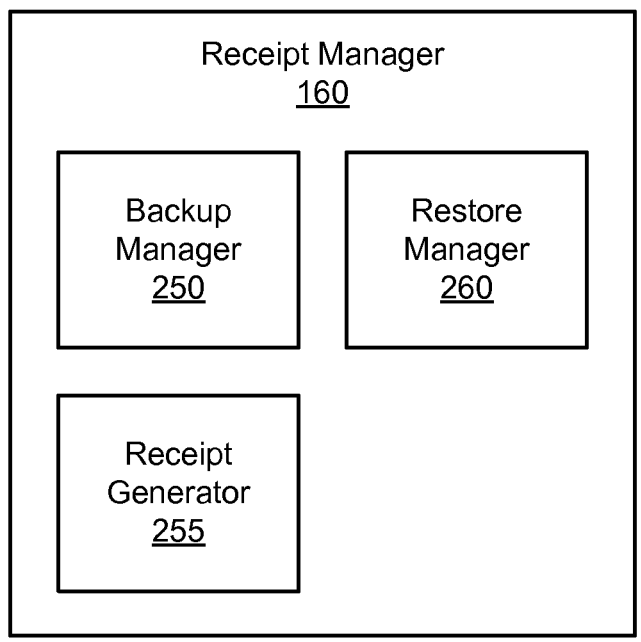
FIG. 2B is a simplified block diagram illustrating components of an example receipt manager, according to one embodiment.

FIG. 2B is a simplified block diagram illustrating components of an example receipt manager 160, which can be implemented in a backup server 130, for example. Receipt manager 160 is configured to communicate with trust deduplication modules 150 in system 100. Receipt manager 160 can include various components, such as backup manager 250, receipt generator 255, and restore manager 260, which are further discussed below.

Backup manager 250 is configured to communicate with a backup server component (not shown) implemented on backup server 130. The backup server component can be an off-the-shelf product, and is configured to perform backup operations (e.g., store a file in backup storage 140). Restore manager 260 is configured to communicate with a restore server component (not shown) implemented on backup server 130. The restore server component can be an off-the-shelf product, and is configured to perform restore operations (e.g., retrieve a file from backup storage 140).

Backup manager 250 is configured to receive a backup request for a file from a trust deduplication module (e.g., from backup request module 225 within a trust deduplication module). Backup manager 250 is configured to store the file (which is also received from the trust deduplication module) in deduplicated data store 170, via the backup server component.

Backup manager 250 is also configured to trigger receipt generator 255 to generate a backup receipt for the file. The backup receipt indicates that the file has been backed up (e.g., stored in deduplicated data store 170). The backup receipt also includes a file identifier (ID) that identifies the file in deduplicated data store 170 (e.g., identifies the file from among other files stored in deduplicated data store 170). For example, a file ID can include an address or location of the file in deduplicated data store 170, a pointer to the file in deduplicated data store 170, or a hash value generated for the encrypted file (where an index of hash values and associated addresses, locations, and/or pointers of encrypted files is maintained by the backup storage and/or backup server, and where a hash value computed from ciphertext of the encrypted file is not identical to a hash value computed from cleartext of the unencrypted file). Backup manager 250 then transmits the backup receipt to the trust deduplication module (e.g., to backup request module 225).

Restore manager 260 is configured to receive a restore request for a file from a trust deduplication module (e.g., from restore request module 230). The restore request also includes a backup receipt of the file. Restore manager 260 is configured to identify the file using the file identifier in the backup receipt, and retrieve the identified file from deduplicated data store 170 (e.g., retrieve the file located at an address, location, or pointer provided by a file ID in the received backup receipt, or determine the address, location, or pointer of the file to be retrieved by searching the index of hash values for a hash value provided by the file ID). Restore manager 260 then transmits the retrieved file to the trust deduplication module (e.g., to restore request module 230).

Figure 3A:
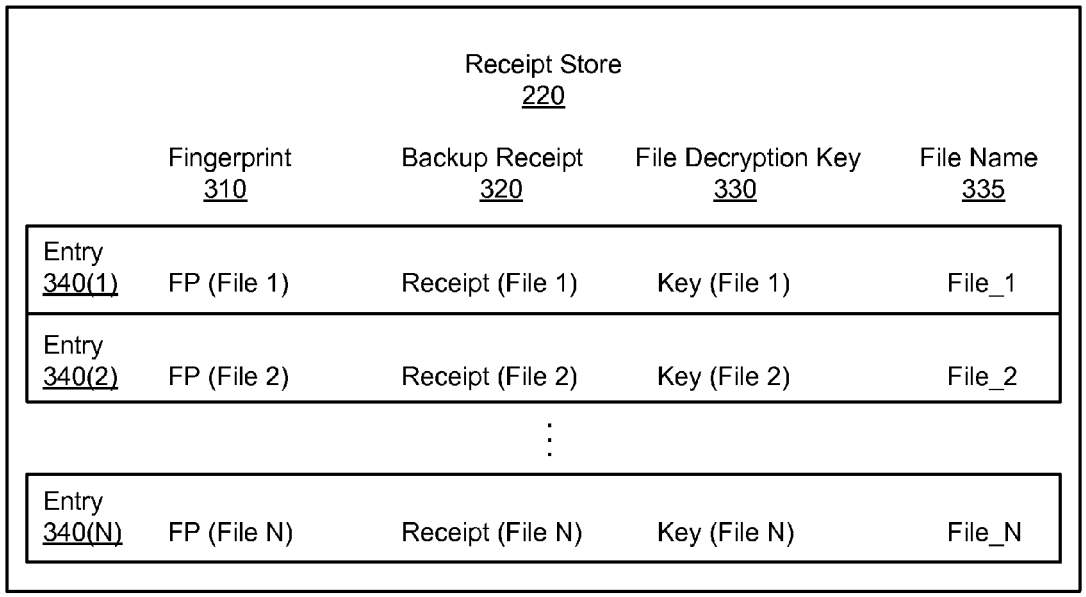
FIGS. 3A and 3B are a simplified block diagrams illustrating components of an example receipt store, according to one embodiment.
Figure 3B:
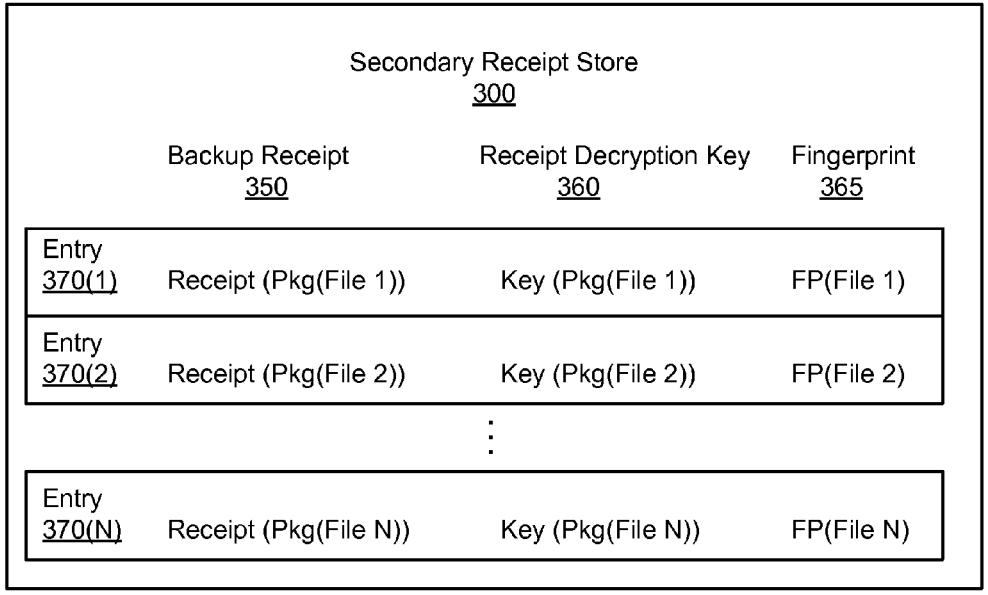

FIGS. 3A and 3B are simplified block diagrams illustrating components of an example receipt store. FIG. 3A illustrates receipt store 220, which is configured to locally store backup receipts of encrypted files (e.g., local to trust deduplication module). FIG. 3B illustrates a secondary receipt store 300, which is used in addition to receipt store 220 in an embodiment where backup receipts of encrypted files are stored remotely (e.g., remote from trust deduplication module). In such an embodiment, secondary receipt store 300 is configured to locally store backup receipts of encrypted receipt packages, where the backup receipts of encrypted files are temporarily locally stored in receipt store 220, as further discussed below.

Receipt store 220 stores a set of entries 340(1)-(N) that each store backup information about a respective file. Each entry 340 includes a fingerprint 310 of a file, a backup receipt 320 of the file, and a file decryption key 330 that will decrypt the encrypted version of the file (which is stored in backup storage 140). In some embodiments, additional information can be stored in receipt store 220, such as a file name 335 of the file. Fingerprint 310, backup receipt 320, and file decryption key 330 of an entry 340 are associated with one another (e.g., by virtue of the fingerprint, receipt, and file decryption key relating to a given file). A new entry can be added to receipt store 220 in response to receipt of a backup receipt (e.g., a backup receipt received from another trust deduplication module as part of a set of backup information or a backup receipt received directly from the receipt manager).

Each backup receipt stored in receipt store 220 indicates that a respective file owned by a user (who is associated with the present trust deduplication module) has already been backed up. An example backup receipt stored in receipt store 220 can be a backup receipt that was received from receipt manager 160 (where the file was backed up by the present trust deduplication module). Another example backup receipt stored in receipt store 220 can be a backup receipt that was received from another trust deduplication module (e.g., received in response to a trust deduplication request sent from the present trust deduplication module).

A present trust deduplication module (e.g., via a broadcast module) can search receipt store 220 for a requested file fingerprint, in response to receiving a trust deduplication request. If a receipt store entry that contains a fingerprint matching the requested file fingerprint is found (or located), the backup receipt associated with the matching fingerprint (e.g., the backup receipt included in the same entry as the matching fingerprint) is determined to correspond with the requested file fingerprint. The backup receipt and associated file decryption key (e.g., file decryption key included in the same entry as the matching fingerprint and corresponding backup receipt), as well as any other associated backup information, can be included in a response to the trust deduplication request.

In another embodiment, trust deduplication module (e.g., broadcast module 210 and/or backup request module 225) is configured to store backup information (e.g., backup receipts and file decryption keys) remotely in backup storage 140, where backup receipts of the backup information are stored locally in secondary receipt store 300. As described above (with regard to backup request module 225), backup information from an entry 340 of receipt store 220 (e.g., fingerprint 310, backup receipt 320, and file encryption key 330) is packaged together into a receipt package file. The receipt package file is encrypted and backed up to backup storage. A backup receipt for the encrypted receipt package file is received and stored locally in secondary receipt store 300.

Secondary receipt store 300 stores a set of entries 370(1)-(N) that each store receipt information about a respective receipt package file. Each entry 370 includes a backup receipt 350 of a receipt package file and a receipt decryption key 360 that will decrypt the encrypted version of the receipt package file. In some embodiments (discussed below), additional information can be stored in secondary receipt store 300, such as a fingerprint 365 (or file name) of the file with which the receipt package file is associated (e.g., associated by virtue of the receipt package file containing backup information about the file). A new entry can be added to receipt store 220 whenever a backup receipt is received (e.g., a backup receipt received from receipt manager).

When responding to a received trust deduplication request in such an embodiment, a present trust deduplication module (e.g., via broadcast module 210) would restore one or more encrypted receipt package files from backup storage 140 (e.g., via restore request module 230) by sending one or more backup receipts 350 of the encrypted receipt package files to restore manager 260. Trust deduplication module would then decrypt the (received) one or more encrypted receipt package files (e.g., via encryption/decryption module) using respective receipt decryption keys 360, and populate receipt store 220 with the one or more receipt package files (e.g., by storing fingerprint 310, backup receipt 320, and file decryption key 330 of each receipt package file in a respective entry 340 of receipt store 220). The entries 340(1)-(N) can be stored temporarily in receipt store 220 in order to perform the search for a backup receipt that corresponds to the requested file fingerprint (e.g., to search receipt store 220 for a file fingerprint included in the received trust deduplication request). Once the search is complete (and after any located backup receipt and associated file decryption key are sent in a response to the request), the entries 340 in receipt store 220 can be deleted.

In another embodiment, the trust deduplication module need not restore all receipt package files in order to search for the requested file fingerprint. Instead, trust deduplication module would search secondary receipt store 300 for the requested file fingerprint, in an embodiment where secondary receipt store 300 stores fingerprints 365. If a secondary receipt store entry that contains a fingerprint matching the requested file fingerprint is found (or located), the backup receipt associated with the matching fingerprint (e.g., the backup receipt included in the same entry as the matching fingerprint) is selected and is used to restore the associated receipt package file. The (restored) associated receipt package file includes the backup receipt (and associated file decryption key) corresponding to the requested file fingerprint, which are then included in a response to the request.

In another embodiment, a user that wishes to restore a file can provide a file name of the requested file (or requested file name). Trust deduplication module can search receipt store 220 and/or secondary receipt store 300 for the file name, in an embodiment where receipt store 220 and/or secondary receipt store 300 stores file names. If an entry (e.g., a receipt store entry or a secondary receipt store entry) that contains a file name matching the requested file name is found, the backup receipt associated with the matching file name is selected, and is used to restore the file (either by sending the backup receipt to restore the requested file, or by using the backup receipt to restore an associated receipt package file that is used to restore the requested file).

Figure 4:
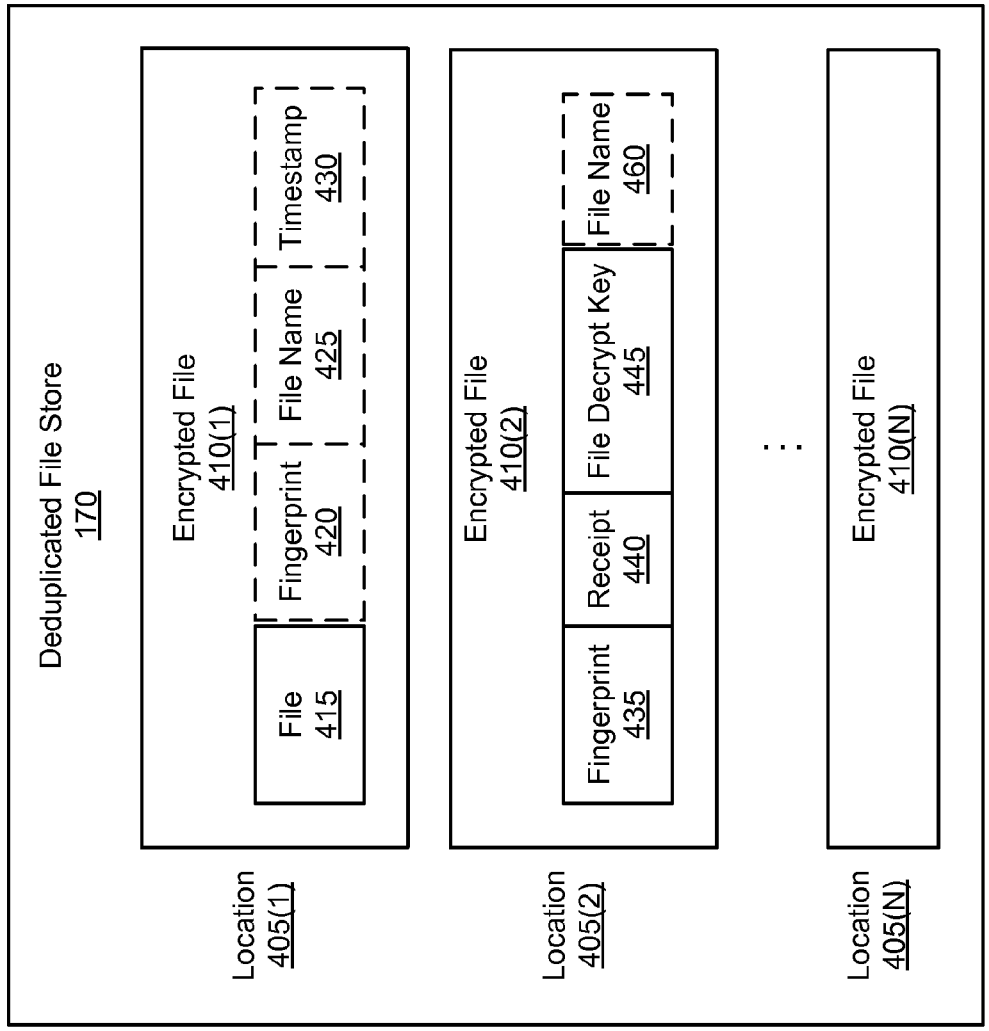
FIG. 4 is a simplified block diagram illustrating components of files and associated receipts, according to one embodiment.
Figure 4:
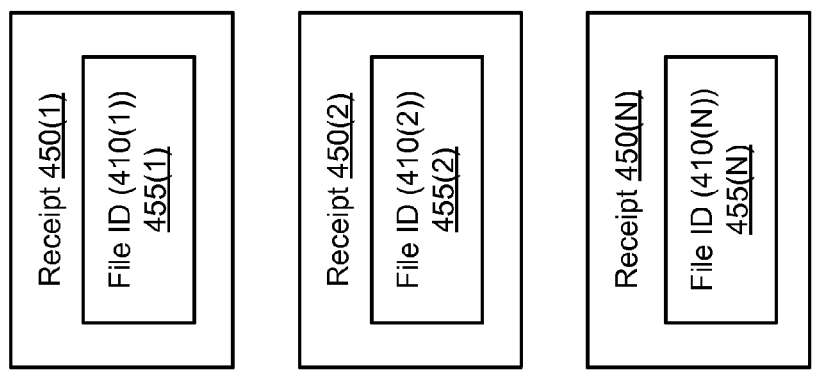

FIG. 4 is a simplified block diagram illustrating components of stored files and associated receipts. Deduplicated data store 170 stores encrypted files 410(1)-(N) and is not able to distinguish encrypted files from one another (e.g., is unaware whether the encrypted file is a file or a backup receipt). Each receipt 450 identifies an associated encrypted file 410. Receipt 450 can include a file identifier (ID) 410 of an encrypted file 410, which can include an address, location, or pointer of the associated encrypted file 410. In one embodiment, the file ID can be a hash value generated for the encrypted file, where the backup storage and/or backup server maintains an index of hash values and associated addresses, locations, or pointers of encrypted files (and where a hash value computed from ciphertext of the encrypted file is not identical to a hash value computed from cleartext of the unencrypted file).

Encrypted file 410(1) is an example encrypted file that includes a file 415, and possible additional information, such as a fingerprint 420 of file 415, a file name 425 of file 415, and/or a timestamp 430 indicating when file 415 was backed up (e.g., transmitted to backup storage). Encrypted file 410(2) is an example encrypted receipt package file that includes a fingerprint 435 of a file, a backup receipt 440 of the file, a file decryption key 445 of the file, and possible additional information, such as a file name 460 of the file. If backup receipt 440 is for file 415, then fingerprint 435 would be the same value as fingerprint 420 and file name 460 would be the same value as file name 425.

Figure 5A:
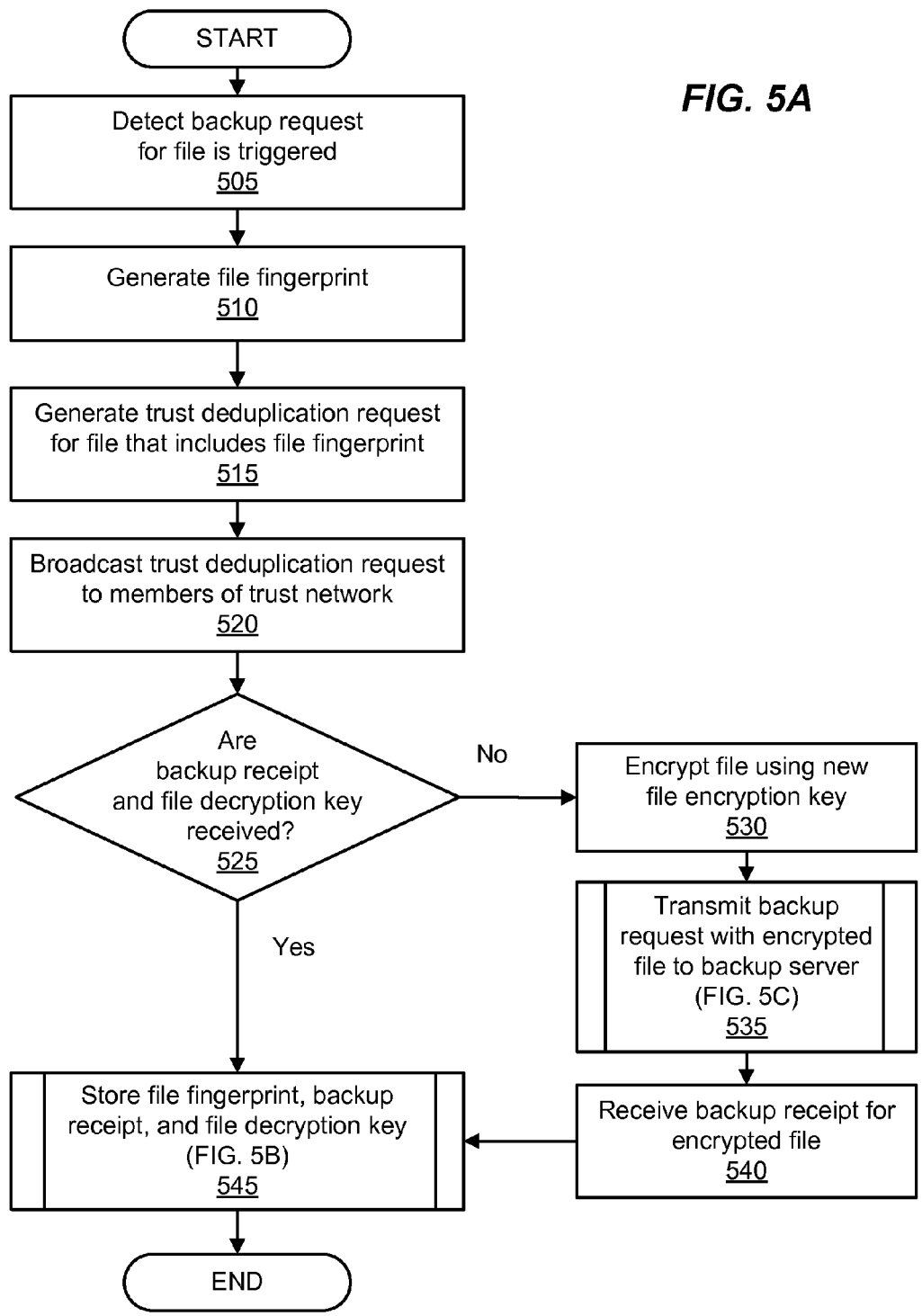

FIGS. 5A, 5B, and 5C are flowcharts illustrating an example backup process cooperatively performed by a trust deduplication module and a receipt manager. In one embodiment, FIGS. 5A and 5B are performed by a trust deduplication module implemented on a client system, and FIG. 5C is performed by a receipt manager implemented on a backup server.

The process illustrated in FIG. 5A begins at operation 505, where the trust deduplication module detects that a backup request for a file is triggered. A backup request for a file can be triggered in response to an input received from a first user (e.g., a user input is received at a user interface implemented on a client system associated with the first user, where the user input is routed to the trust deduplication module) or can be triggered at a previously scheduled backup time to perform a backup of the file.

The process continues to operation 510, where a fingerprint generator generates a fingerprint of the file (or file fingerprint), where the fingerprint identifies the file. The fingerprint is generated using cleartext of the file. The process continues to operation 515, where the broadcast module generates a trust deduplication request for the file, where the trust deduplication request includes the file fingerprint generated by the fingerprint generator.

The process continues to operation 520, where the broadcast module transmits or broadcasts the trust deduplication request to other broadcast modules associated with members of the first user's trust network. In other words, the broadcast module sends the trust deduplication request to each of a set of broadcast modules, where each of the set of broadcast modules is associated with one of a group of users that have been previously identified by the first user as trusted users.

The process continues to operation 525, where the broadcast module determines whether a backup receipt corresponding to the file and an associated file decryption key are received from any of the set of broadcast modules to which the request was sent. If a backup receipt and associated file decryption key are received from at least one of the set of broadcast modules, the process continues to operation 545, where the broadcast module stores the file fingerprint that identifies the file (which was generated from cleartext of the file), the (received) backup receipt that identifies the encrypted file in backup storage, and the (received) file decryption key that will decrypt the encrypted file locally in an entry of a receipt store. FIG. 5B illustrates another embodiment of operation 545, where backup information (e.g., backup receipt and key(s)) is stored remotely in backup storage. The process then ends.

Returning to operation 525, if a backup receipt and associated file decryption key are not received (e.g., a negative acknowledgement is received from each of the set of broadcast modules, or no response is received from any of the set of broadcast module within a pre-defined response window), the process continues to operation 530. In operation 530, the encryption/decryption module generates a new file encryption key and encrypts the file using the new file encryption key, which produces an encrypted file.

The process continues to operation 535, where the backup request module generates and transmits a backup request for the encrypted file to a receipt manager on the backup server. The encrypted file is also transmitted to the backup server and/or backup storage. The receipt manager (via a backup server component) performs a file backup process to backup the encrypted file, which is further illustrated in FIG. 5C.

After transmitting the backup request to the backup server, the process continues to operation 540, where the backup request module receives a backup receipt for the encrypted file from receipt manager, where the backup request identifies the encrypted file in backup storage. The process continues to operation 545, where the backup request module stores the file fingerprint (which was generated from cleartext of the file), the (received) backup receipt, and the (generated) new file decryption key (or key pair, used to decrypt the encrypted file) locally in an entry of a receipt store. FIG. 5B illustrates another embodiment of operation 545, where backup information (e.g., backup receipt and key(s)) is stored remotely in backup storage. The process then ends.

FIG. 5B illustrates a storage process for storing file receipts and associated information remotely in backup storage. The process illustrated in FIG. 5B begins at operation 555, where the backup request module packages the backup receipt, the associated file fingerprint, and the associated file decryption key (or key pair) together, which produces a receipt package file. The process continues to operation 560, where the encryption/decryption module generates a new receipt encryption key and encrypts the receipt package file using the new receipt encryption key, which produces an encrypted receipt package file.

The process continues to operation 565, where the backup request module generates and transmits a backup request for the encrypted receipt package file to a receipt manager implemented on the backup server. The encrypted receipt package file is also transmitted to the backup server and/or backup storage. The receipt manager (via a backup server component) performs a file backup process to backup the encrypted receipt package file, which is further illustrated in FIG. 5C.

The process continues to operation 570, where the backup request module receives a backup receipt for the encrypted receipt package file from the receipt manager, where the backup receipt identifies the encrypted receipt package file in backup storage. The process continues to operation 575, where the backup request module stores the backup receipt and the (generated) new receipt decryption key (or key pair, used to decrypt the encrypted receipt package file) locally in an entry of a receipt store. The process then ends.

FIG. 5C illustrates operations performed by a receipt manager during a backup process. The process illustrated in FIG. 5C begins at operation 580, where the backup manager of a receipt manager receives a backup request for an encrypted file (e.g., an encrypted version of a file or an encrypted version of a receipt package file). The encrypted file can also be received at the backup server and/or backup storage. The process continues to operation 585, where backup manager triggers a backup server component to perform a backup operation to store the encrypted file in deduplicated data store in backup storage. The process continues to operation 590, where the backup manager triggers a receipt generator to generate a backup receipt for the encrypted file. The backup receipt includes a file identifier that identifies the encrypted file in deduplicated data store. The process continues to operation 595, where the backup manager transmits the backup receipt to the backup request module. The process then ends.

Figure 6A:
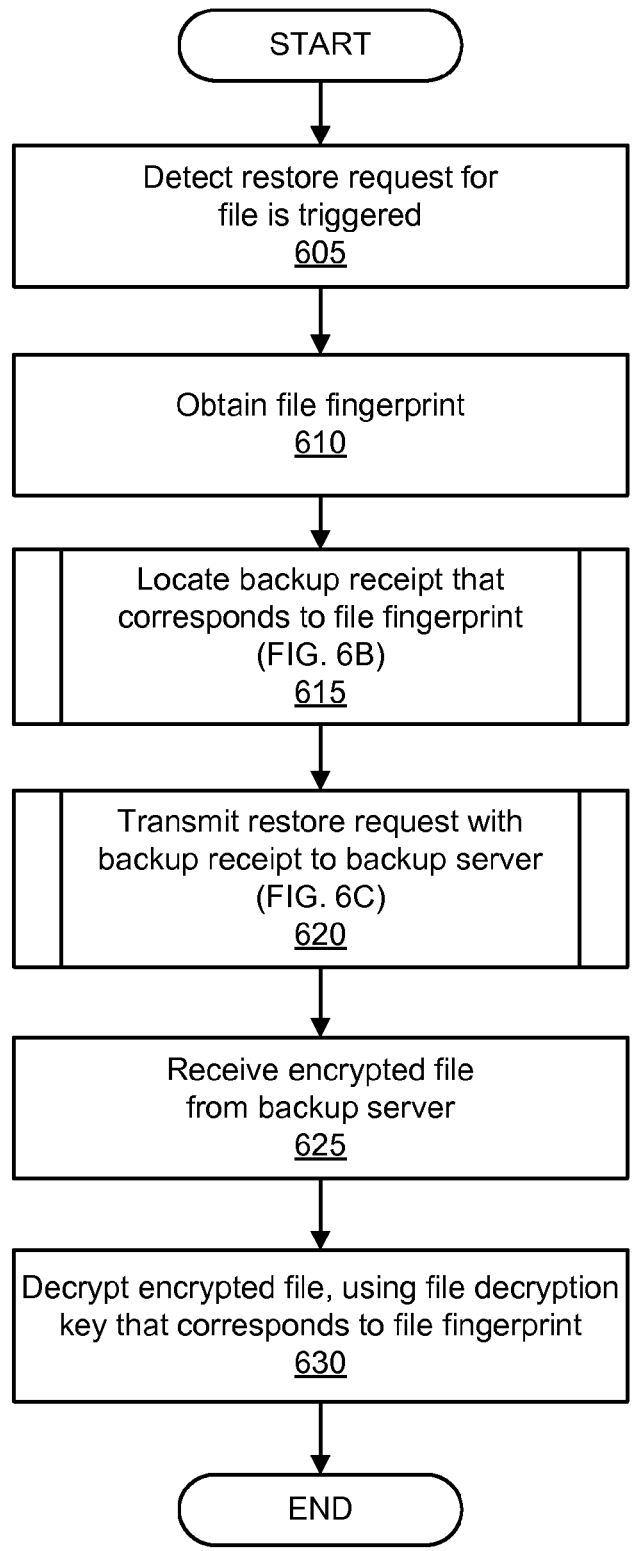
FIGS. 6A, 6B, and 6C are flowcharts illustrating an example restore process, according to one embodiment.
Figure 6B:
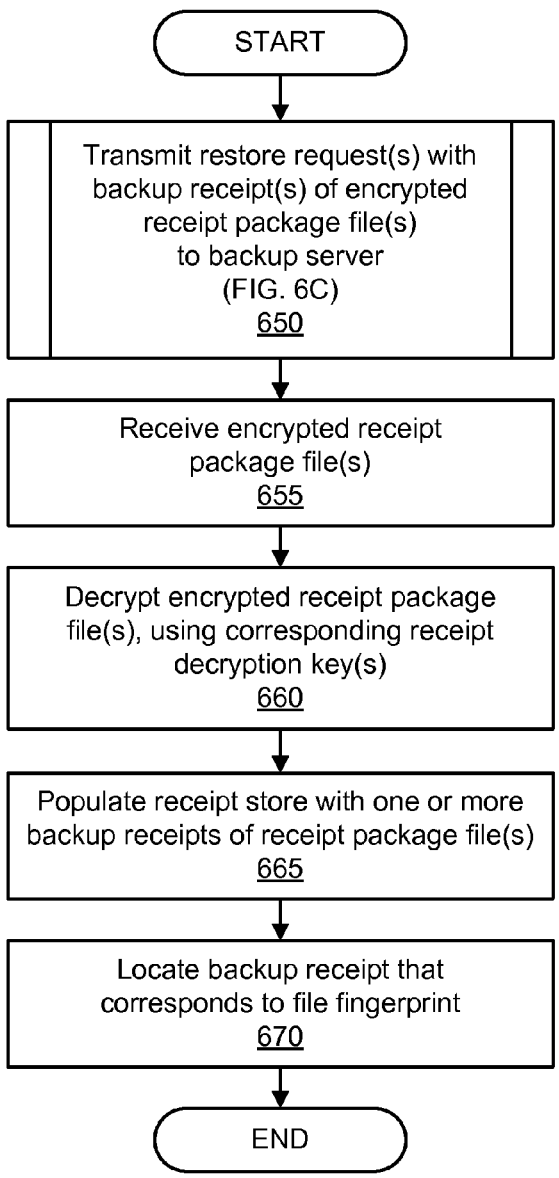
Figure 6C:
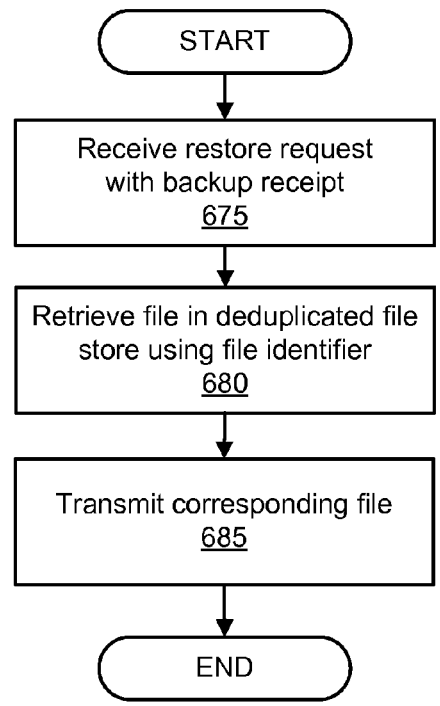

FIGS. 6A, 6B, and 6C are flowcharts illustrating an example restore process cooperatively performed by a trust deduplication module and receipt manager. In one embodiment, FIGS. 6A and 6B are performed by a trust deduplication module implemented on a client system, and FIG. 6C is performed by a receipt manager implemented on a backup server.

The process in FIG. 6A begins at operation 605, where the trust deduplication module detects that a restore request for a file is triggered. A restore request for a file can be triggered in response to an input received from a first user (e.g., a user input is received at a user interface implemented on a client system associated with the first user, where the user input is routed to the trust deduplication module).

The process continues to operation 610, where the restore request module obtains a fingerprint of the file that the first user wishes to restore. In one embodiment, the restore request module can obtain the fingerprint from the user input. In another embodiment, the restore request module can search a local receipt store for a file name of the file that the first user wishes to restore (where the file name is obtained from the user input) and can obtain a file fingerprint that is associated with the matching file name from an entry in the receipt store (e.g., a receipt store that stores backup receipts of files and/or receipt package files can be searched using a fingerprint and/or a file name).

The process continues to operation 615, where the restore request module locates the backup receipt that corresponds to the requested file fingerprint, such as by searching a local receipt store for the requested file fingerprint. In one embodiment, searching a receipt store for a file name and/or file fingerprint may also locate a backup receipt that is associated with an entry containing a matching file name or file fingerprint. FIG. 6B illustrates another embodiment of operation 615, where backup receipts are stored remotely in backup storage.

The process continues to operation 620, where the restore request module transmits a restore request for the file to a receipt manager implemented on the backup server. The restore request includes the backup receipt of the file (which was located in operation 615). The receipt manager (via a restore server component) performs a file restore process to restore (e.g., identify and retrieve) the encrypted file, which is further illustrated in FIG. 6C.

The process continues to operation 625, where the restore request module receives the file as an encrypted version of the file from receipt manager. The process continues to operation 630, where the encryption/decryption module decrypts the encrypted file using the file decryption key that is associated with the file fingerprint (e.g., file decryption key and file fingerprint are in the same entry in receipt store). The process then ends.

FIG. 6B illustrates a restore process for retrieving backup receipts and associated information remotely stored in backup storage (e.g., receipt package files stored in deduplicated data store). The process illustrated in FIG. 6B begins at operation 650, where the restore request module generates and transmits one or more restore requests for the first user's encrypted receipt package files to a receipt manager. The one or more restore requests include one or more backup receipts that identify one or more encrypted receipt package files in backup storage. The receipt manager (via a restore server component) performs a file restore process to restore (e.g., identify and retrieve) the one or more encrypted receipt package files, which is further illustrated in FIG. 6C.

The process continues to operation 655, where the restore request module receives the one or more encrypted receipt package files. The process continues to operation 660, where the encryption/decryption module decrypts the one or more encrypted receipt package files, using one or more respective receipt decryption keys. The process continues to operation 665, where the restore request module populates a local receipt store with one or more backup receipts of the one or more receipt package files. The process continues to operation 670, where the restore request module locates a backup receipt that corresponds to the requested file fingerprint, as discussed above in reference to operation 615. The process then ends.

FIG. 6C illustrates operations performed by a receipt manager during a file restore process. The process illustrated in FIG. 6C begins at operation 675, where a restore manager of a receipt manager receives a restore request for an encrypted file (e.g., an encrypted version of a file or an encrypted version of a receipt package file). The backup receipt that identifies the encrypted file is included with the restore request. The process continues to operation 680, where the restore manager triggers a restore server component to perform a restore operation to retrieve the encrypted file identified by the file ID from backup storage, where the restore manager can extract the file ID from the backup receipt and provide the file ID to the restore server component. The process continues to operation 685, where the restore manager transmits the file to the restore request module. The process then ends.

Figure 7:
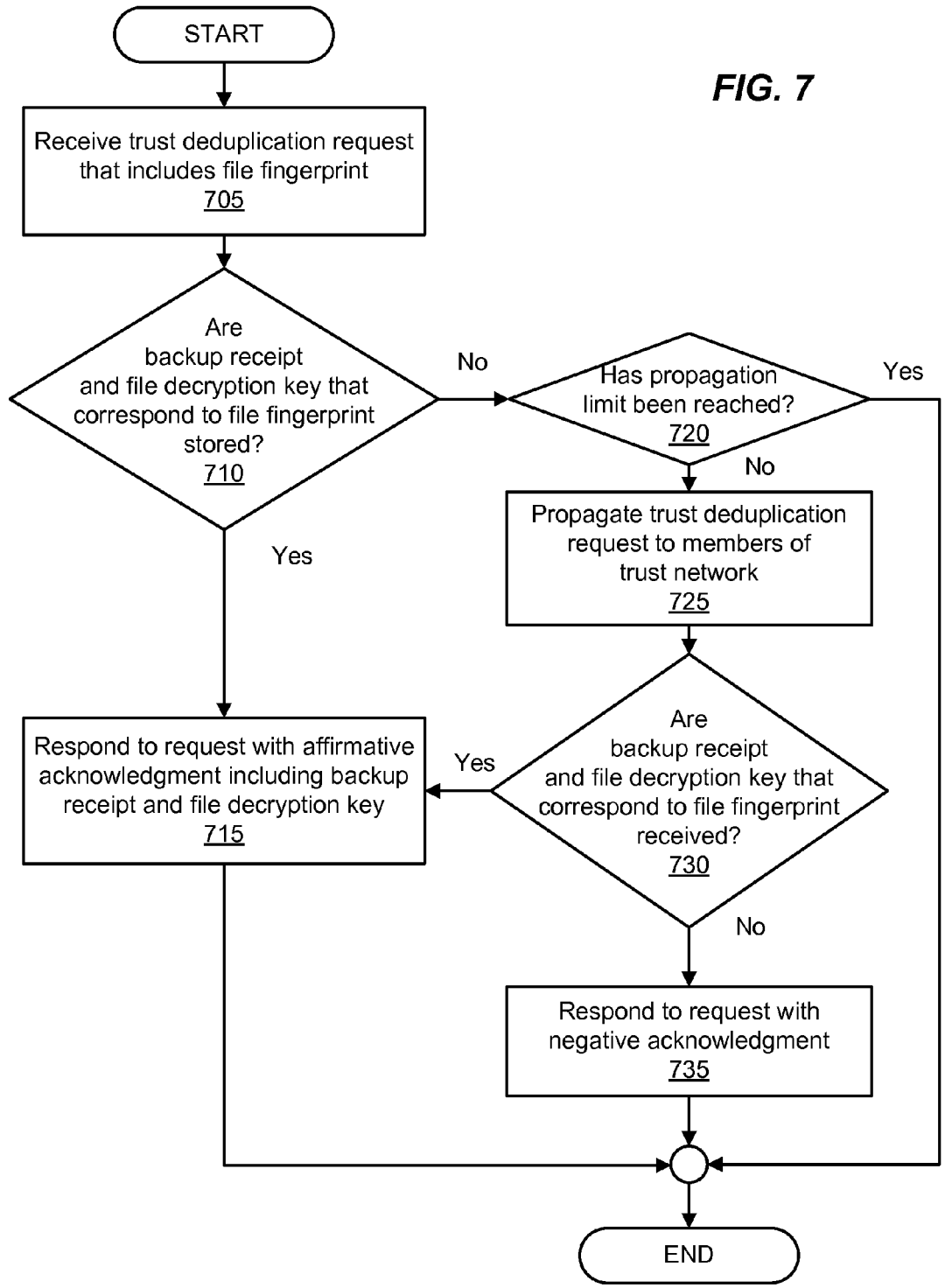
FIG. 7 is a flowchart illustrating an example response process, according to one embodiment.

FIG. 7 is a flowchart illustrating an example response process performed by a trust deduplication module responding to a trust deduplication request (e.g., performed by a responding trust deduplication module). The process illustrated in FIG. 7 begins at operation 705, where a present trust deduplication module receives a trust deduplication request from a requesting trust deduplication module, where the request includes a file fingerprint. The requesting trust deduplication module is associated with a first user, and the present trust deduplication module is associated with a second user.

The process continues to operation 710, where the trust deduplication module determines whether the backup receipt and file decryption key that correspond to the requested file fingerprint are stored at the trust deduplication module (e.g., are found in entries of a local/remote receipt store of the trust deduplication module). If the backup receipt and file decryption key are stored at the trust deduplication module, the process continues to operation 715, where the trust deduplication module responds to the trust deduplication request with an affirmative acknowledgment that includes the backup receipt and file decryption key. The process then ends.

Returning to operation 710, if a backup receipt and file decryption key are not stored at the trust deduplication module (e.g., are not found any entries of a local/remote receipt store of the trust deduplication module), the process continues to operation 720, where the trust deduplication module determines whether a propagation limit of the trust deduplication request has been reached. If the limit has been reached (e.g., the request cannot be propagated), the process ends.

Returning to operation 720, if the propagation limit has not been reached, the process continues to operation 725, where the trust deduplication module propagates the request to members of the second user's trust network. The trust deduplication module can increment or decrement the propagation limit before propagating the request, as needed, in order to reflect the current propagation of the request.

The process then continues to operation 730, where the trust deduplication module determines whether the backup receipt and file decryption key that correspond to the requested file fingerprint are received at the trust deduplication module. If they are received, the process continues to operation 715, where the trust deduplication module responds to the request with the (received) backup receipt and file decryption key. The process then ends.

Returning to operation 730, if the backup receipt and file decryption key are not received, the process continues to operation 735, where the trust deduplication module responds to the request with a negative acknowledgement. The process then ends. It is noted that embodiments that do not support propagation of trust deduplication requests can omit the operations of 720-735.

Figure 8:
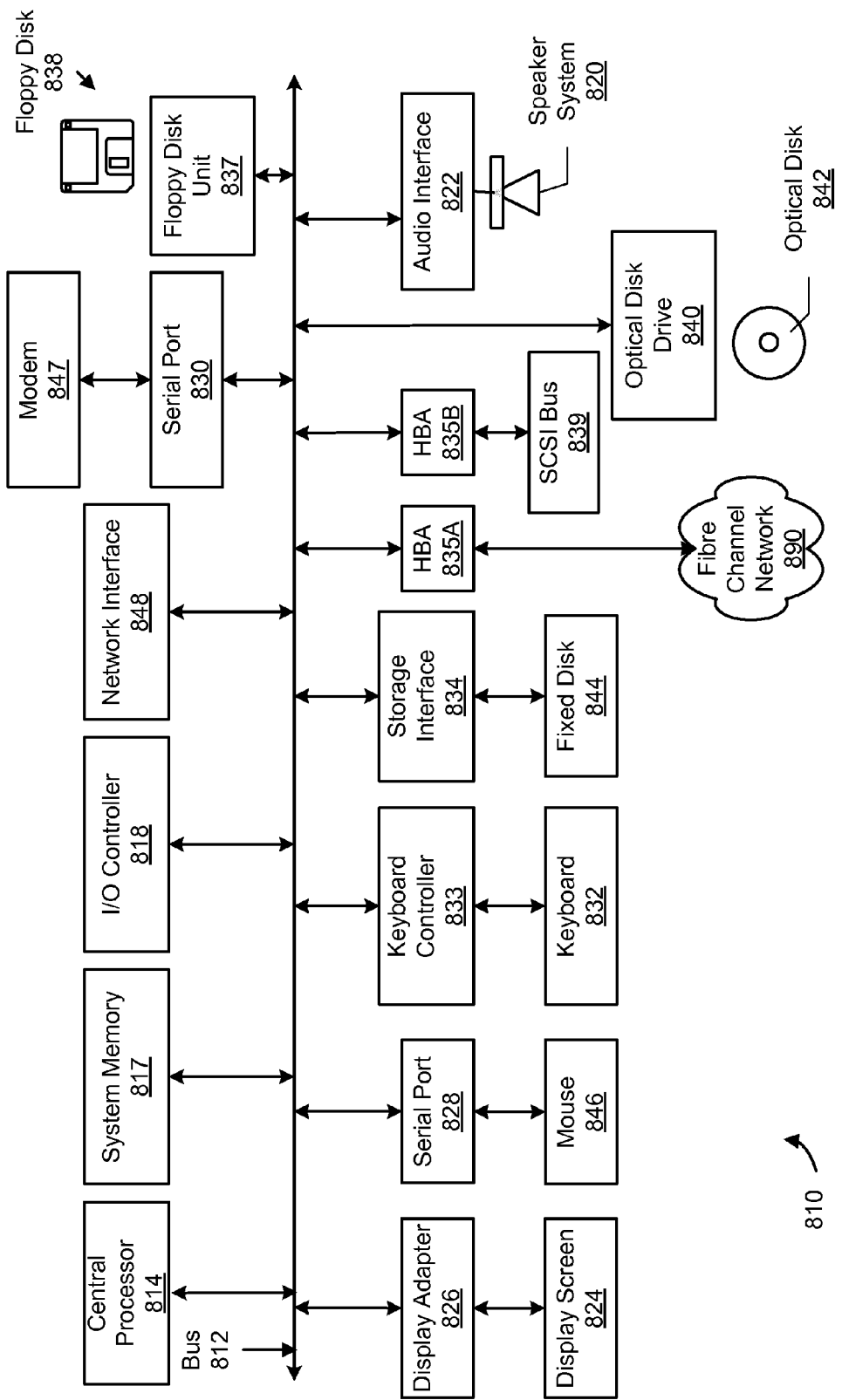
FIG. 8 is a simplified block diagram illustrating components of an example computer system suitable for implementing embodiments of the present disclosure, according to one embodiment.

FIG. 8 is a simplified block diagram that illustrates components of an example computer system 810 that is suitable for implementing the present disclosure. Computer system 810 may be illustrative of various computer systems in the backup system 100, such as system(s) 110, 130, and/or 140, among others. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. Code for the automatically performing operations on such applications based on their dependencies on other applications (such as described above with reference to the process of FIG. 5-7), etc., to implement the present disclosure can be stored in computer-readable storage media such as one or more of system memory 817, fixed disk 844, optical disk 842, or floppy disk 838. Memory 817 is also used for storing temporary variables or other intermediate information during the execution of instructions by the processor 814. The operating system provided on computer system 810 may be MS-DOS®, MS-WINDOWS®, OS/2®, UNIX®, Linux®, or another known operating system.

Moreover, regarding the signals described herein, it will be understood that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
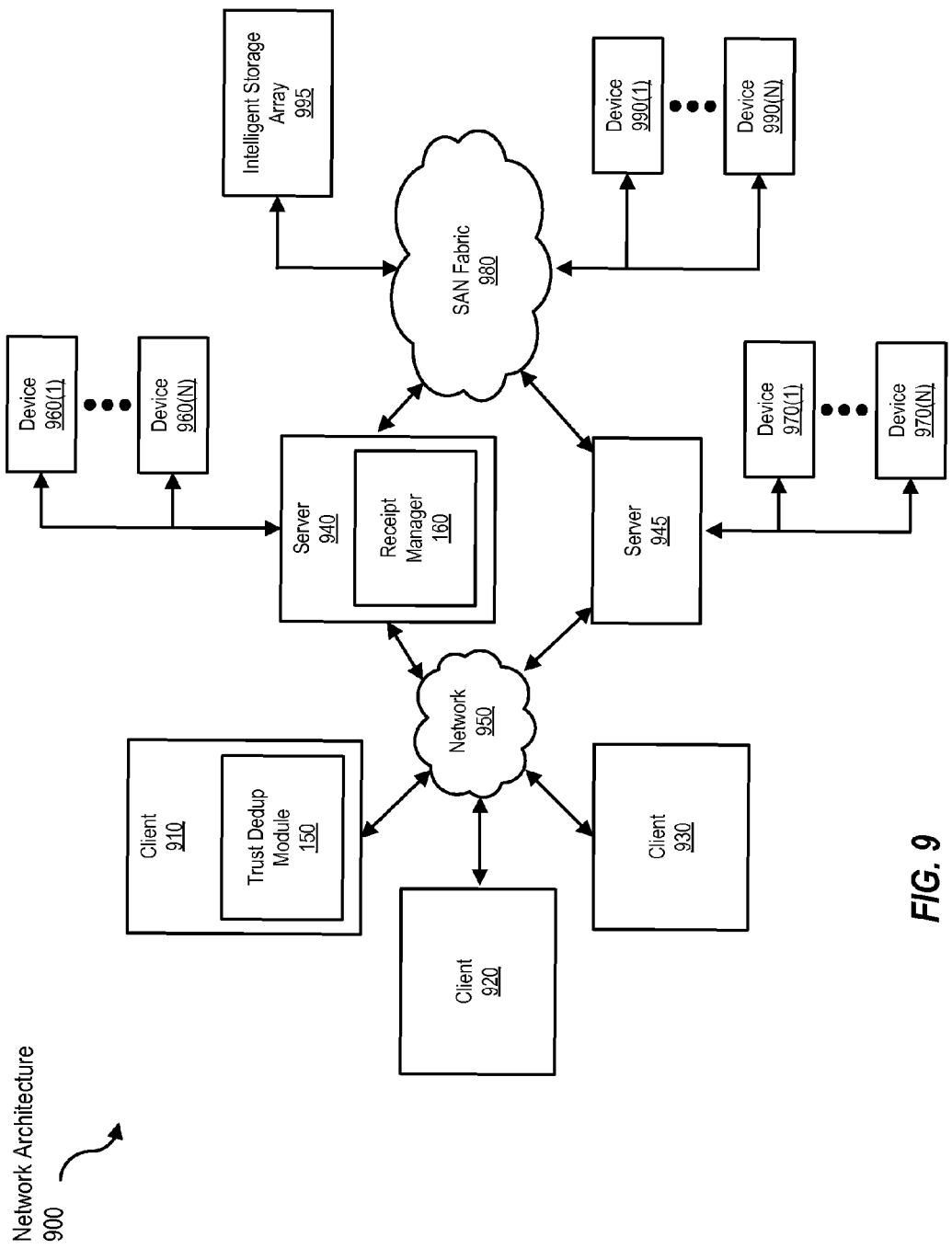
FIG. 9 is a simplified block diagram illustrating components of an example computer system suitable for implementing embodiments of the present disclosure, according to one embodiment.

FIG. 9 is a simplified block diagram illustrating components of an example computer system suitable for implementing embodiments of the present disclosure. FIG. 9 illustrates a network system 900 in which client systems 910, 920 and 930 and servers 940, and 945 can be coupled to a network 950. Client systems 910, 920 and 930 generally represent any type or form of computing device or system, such as client systems 110 in FIG. 1 or computer system 810 in FIG. 8.

Similarly, servers 940 and 945 generally represent computing devices or systems, such as application servers or database servers, configured to provide various database services and/or run certain software applications, such as backup server 130 in FIG. 1 or computer system 810 in FIG. 8. Network 950 generally represents any telecommunication or computer network including, for example, an intranet, a wide area network (WAN), a local area network (LAN), a personal area network (PAN), or the Internet. In one example, client systems 910, 920 and/or 930 can include a trust deduplication module 150, as shown in FIGS. 1 and 2A, and/or servers 940 and/or 945 can include a receipt manager 160, as shown in FIGS. 1 and 2B.

As illustrated in FIG. 9, one or more storage devices 960(1)-(N) can be directly attached to server 940. Similarly, one or more storage devices 970(1)-(N) can be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) can represent network-attached storage (NAS) devices configured to communicate with servers 940 and 945 using various protocols, such as Network File System (NFS), Server Message Block (SMB), or Common Internet File System (CIFS).

Servers 940 and 945 can also be connected to a storage area network (SAN) fabric 980. SAN fabric 980 generally represents any type or form of computer network or architecture capable of facilitating communication between multiple storage devices. SAN fabric 980 can facilitate communication between servers 940 and 945 and a plurality of storage devices 990(1)-(N) and/or an intelligent storage array 995. SAN fabric 980 can also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to computer system 810 of FIG. 8, a communication interface can be used to provide connectivity between each client system 920 and 930 and network 950. Client systems 910, 920 and 930 can be able to access information on server 940 or 945 using, for example, a web browser or other client software. Such software can allow client systems 910, 920 and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the embodiments disclosed herein can be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the embodiments disclosed herein can also be encoded as a computer program, stored in and run by server 940 and server 945, and distributed to client systems 910, 920 and 930 over network 950.

In some examples, all or a portion of the computing devices in FIGS. 1, 8, and 9 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In addition, one or more of the components described herein can transform data, physical devices, and/or representations of physical devices from one form to another. For example, a trust deduplication module 150 in FIG. 1 can transform information (e.g., receipt) received from a client system into a copy of a file.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

The invention claimed is:

1. A method comprising:
   detecting a backup request for a requested file, wherein
      the backup request is received from a first computing device operated by a first user of a plurality of users, and
      the backup request indicates that the requested file is to be backed up to a deduplicated data store;
   determining whether the requested file was backed up to the deduplicated data store by a second computing device operated by a second user of the plurality of users, wherein
      the determining comprises sending a trust deduplication request for the requested file to the second computing device,
      the first user identifies the second user as a trusted user in a first trust network via an application that tracks which users of the plurality of users are trusted by the first user, and
      the trust deduplication request comprises a fingerprint corresponding to the requested file,
      the second computing device is configured to forward the trust deduplication request to a third computing device operated by a third user in response to the third user being identified, via the application, as being included in a second trust network, and
      the third user is not identified by the first user as a trusted user; and
   discarding the backup request, in response to receiving an affirmative acknowledgement to the trust deduplication request, wherein the affirmative acknowledgment comprises
      a response from the second user indicating that the requested file has been backed up, and
      backup information comprising a backup receipt that identifies the requested file and a decryption key for the requested file;
   packaging the backup information into a receipt package file; and
   transmitting the receipt package file to the deduplicated data store, wherein the deduplicated data store is configured to back up the receipt package file.

2. The method of claim 1, further comprising:
   backing up the requested file, in response to receiving a negative acknowledgement from each computing device to which the trust deduplication request was sent, wherein
      the negative acknowledgment comprises a response from the each computing device indicating that the each computing device does not have knowledge that the requested file has been backed up.

3. The method of claim 2, further comprising:
   receiving a backup receipt for the requested file, in response to the backing up the requested file, wherein
      the backup receipt is received from a backup server, and
      the backup receipt identifies the requested file.

4. The method of claim 2, further comprising:
   encrypting the requested file to produce an encrypted file, wherein
      the encrypted file is configured to be decrypted using a decryption key, and
      the backing up the requested file comprises
         backing up the encrypted file.

5. The method of claim 1, further comprising:
   storing the backup information in an entry of a receipt store, wherein
      the backup request comprises a fingerprint that identifies the requested file, and
      the storing the backup information further comprises storing the fingerprint in the entry of the receipt store.

6. An apparatus comprising:
   a processor; and
   a memory coupled to the processor and configured to store instructions executable by the processor to implement a method comprising:
   detecting a backup request for a requested file, wherein
      the backup request is received from a first computing device operated by a first user of a plurality of users, and
      the backup request indicates that the requested file is to be backed up to a deduplicated data store;
   determining whether the requested file was backed up to the deduplicated data store by a second computing device operated by a second user of the plurality of users, wherein
      the determining comprises sending a trust deduplication request for the requested file to the second computing device,
      the first user identifies the second user as a trusted user in a first trust network via an application that tracks which users of the plurality of users are trusted by the first user,
      the trust deduplication request comprises a fingerprint corresponding to the requested file;
      the second computing device is configured to forward the trust deduplication request to a third computing device operated by a third user in response to the third user being identified, via the application, as being included in a second trust network, and
      the third user is not identified by the first user as a trusted user; and
   discarding the backup request, in response to receiving an affirmative acknowledgement to the trust deduplication request, wherein the affirmative acknowledgment comprises a response from the second user indicating that the requested file has been backed up, and backup information comprising a backup receipt that identifies the requested file and a decryption key for the requested file;

packaging the backup information into a receipt package file; and transmitting the receipt package file to the deduplicated data store, wherein the deduplicated data store is configured to back up the receipt package file.

7. The apparatus of claim 6, wherein the method further comprises backing up the requested file, in response to receiving a negative acknowledgement from each computing device to which to the trust deduplication request was sent, wherein the negative acknowledgment comprises a response from the each computing device indicating that the each computing device does not have knowledge that the requested file has been backed up.

8. The apparatus of claim 7, wherein the method further comprises receiving a backup receipt for the requested file, in response to the backing up the requested file, wherein the backup receipt is received from a backup server, and
the backup receipt identifies the requested file.

9. The apparatus of claim 7, wherein the method further comprises encrypting the requested file to produce an encrypted file, wherein the encrypted file is configured to be decrypted using a decryption key, and the backing up the requested file comprises
backing up the encrypted file.

10. The apparatus of claim 6, wherein the method further comprises storing the backup information in an entry of a receipt store, wherein the backup request comprises a fingerprint that identifies the requested file, and the storing the backup information further comprises storing the fingerprint in the entry of the receipt store.

11. A computer readable storage medium configured to store program instructions that, when executed on a processor, are configured to cause the processor to perform a method comprising:

detecting a backup request for a requested file, wherein
the backup request is received from a first computing device operated by a first user of a plurality of users, and the backup request indicates that the requested file is to be backed UP to a deduplicated data store;

determining whether the requested file was backed up to the deduplicated data store by a second computing device operated by a second user of the plurality of users, wherein the determining comprises sending a trust deduplication request for the requested file to the second computing device, the first user identifies the second user as a trusted user in a first trust network via an application that tracks which users of the plurality of users are trusted by the first user, and the trust deduplication request comprises a fingerprint corresponding to the requested file, the second computing device is configured to forward the trust deduplication request to a third computing device operated by a third user in response to the third user being identified, via the application, as being included in a second trust network; and the third user is not identified by the first user as a trusted user; and discarding the backup request, in response to receiving an affirmative acknowledgement to the trust deduplication request, wherein the affirmative acknowledgment comprises a response from the second user indicating that the requested file has been backed up, and backup information comprising a backup receipt that identifies the requested file and a decryption key for the requested file;

packaging the backup information into a receipt package file; and transmitting the receipt package file to the deduplicated data store, wherein the deduplicated data store is configured to back up the receipt package file.

12. The computer readable storage medium of claim 11, wherein the method further comprises backing up the requested file, in response to receiving a negative acknowledgement from each computing device to which the trust deduplication request was sent, wherein the negative acknowledgment comprises a response from the each computing device indicating that the each computing device does not have knowledge that the requested file has been backed up.

13. The computer readable storage medium of claim 12, wherein the method further comprises receiving a backup receipt for the requested file, in response to the backing up the requested file, wherein the backup receipt is received from a backup server, and
the backup receipt identifies the requested file.

14. The computer readable storage medium of claim 12, wherein the method further comprises encrypting the requested file to produce an encrypted file, wherein the encrypted file is configured to be decrypted using a decryption key, and the backing up the requested file comprises
backing up the encrypted file.

15. The computer readable storage medium of claim 11, wherein the method further comprises storing the backup information in an entry of a receipt store, wherein the backup request comprises a fingerprint that identifies the requested file, and the storing the backup information further comprises storing the fingerprint in the entry of the receipt store.

16. The method of claim 1, wherein the trust deduplication request comprises information identifying the requested file.

17. The method of claim 1, wherein the discarding the backup request comprises ignoring the backup request.

18. The method of claim 1, wherein
the application comprises a social media application.

* * * * *